US007780856B2

(12) United States Patent
Liou

(10) Patent No.: US 7,780,856 B2
(45) Date of Patent: Aug. 24, 2010

(54) DEVICE FOR ON-LINE LIGHT RADIATION IN GAS-CONTAINING LIQUID

(76) Inventor: Huei-Tarng Liou, 3F., No. 6, Alley 20, Lane 85, Changsing St., Da-an District, Taipei City 106 (TW)

( * ) Notice: Subject to any disclaimer, the term of this patent is extended or adjusted under 35 U.S.C. 154(b) by 1061 days.

(21) Appl. No.: 11/495,597

(22) Filed: Jul. 28, 2006

(65) Prior Publication Data
US 2008/0023411 A1 Jan. 31, 2008

(51) Int. Cl.
C02F 1/32 (2006.01)
(52) U.S. Cl. ............... 210/748.1; 210/748.15; 210/748.19; 210/760
(58) Field of Classification Search .......... 210/748.01, 210/748.1, 748.15, 748.19, 760
See application file for complete search history.

(56) References Cited

U.S. PATENT DOCUMENTS

| 5,725,757 | A | 3/1998 | Binot |
| 6,454,937 | B1 | 9/2002 | Horton et al. |
| 6,535,023 | B1 | 3/2003 | Williams et al. |
| 6,955,341 | B2 | 10/2005 | Liou |
| 2001/0032659 | A1 | 10/2001 | Wang et al. |
| 2006/0037899 | A1 | 2/2006 | Liou |

FOREIGN PATENT DOCUMENTS

| DE | 296 09 998 | 8/1996 |
| EP | 1 038 835 | 9/2000 |
| EP | 1 371 611 | 12/2003 |
| GB | 2 417 217 | 2/2006 |
| RU | 2 042 637 | 8/1995 |
| WO | 96/14272 | 5/1996 |
| WO | 99/40032 | 8/1999 |
| WO | 02/083570 | 10/2002 |

OTHER PUBLICATIONS

Patent Abstract and English Translation of GB 2 417 217 dated Feb. 22, 2006.
Patent Abstract of EP 1 038 835 dated Sep. 27, 2000.
Patent Abstract of RU 2 042 637 dated Aug. 27, 1995.
Patent Abstract and English Translation of WO 02/083570 dated Oct. 24, 2002.
Patent Abstract of DE 296 09 998 dated Aug. 8, 1996.
Patent Abstract and English Translation of WO 99/40032 dated Aug. 12, 1999.
Patent Abstract and English Translation of EP 1 371 611 dated Dec. 17, 2003.
Patent Abstract and English Translation of WO 96/14272 dated May 17, 1996.
Patent Abstract of US 2001/032659 dated Oct. 25, 2001.

*Primary Examiner*—Walter D Griffin
*Assistant Examiner*—Cameron J Allen
(74) *Attorney, Agent, or Firm*—Ladas and Parry LLP

(57) ABSTRACT

A device for on-line radiating gas-containing liquid with light that can mix ozone and water, and radiate the same on-line as well as remove accretions on protective sheaths (preferably quartz tubes) of the device to reduce energy loss. Ozone and water is mixed in a gas-liquid mixer of the device and the ozone-water mixture is guided by a conduct of a gas-liquid separator of the device and spayed out to be radiated by multiple UV lamps protected by the protective sheaths. The accretions on the protective sheaths are removed by scraper mechanisms of a washing assembly of the device.

12 Claims, 7 Drawing Sheets

DEVICE FOR ON-LINE LIGHT RADIATION IN GAS-CONTAINING LIQUID

FIELD OF THE INVENTION

This invention relates generally to a device for on-line radiating gas (e.g. ozone) containing liquid (e.g. water) with light (e.g. UV light). In particular, the device is provided with a washing assembly for removing accretions on protective sheaths that enclose lamps.

BACKGROUND OF THE INVENTION

Water is an important resource that is used for many commercial purposes, such as agriculture and swimming pools as well as for household use. Furthermore, clean water that is free from unhealthy chemicals and microorganism is becoming a more precious resource as populations increase. Disinfection of water to remove chemicals and/or microorganisms is an important way to acquire clean water. The use of ultraviolet (UV) light as a disinfecting agent is well known and useful since it leaves no toxic residue in the water. However, the elements of conventional UV reactors are usually submerged in water and mineral deposits or soils therein will attach to the elements thereof and cause energy loss.

Ozone also has the advantage of leaving no residue and is often used in treating water. When ozone is applied to water treatment, a gas-liquid mixer should be provided to dissolve ozone into water. However, conventional gas-liquid mixer utilizing Venturi Tubes have the disadvantages of a low gas dissolving rate and leakage of gas. The problem has been substantially overcome by the techniques disclosed in U.S. Pat. No. 6,534,023, which relates to a fluid dynamic ozone generating assembly.

Accordingly, using both ozone and UV light to treat water can produce highly purified water. Conventionally two separate processes and devices for using ozone and using UV light to treat water are required to obtain the highly purified water. Therefore, it is desirable to provide a single device that can simultaneously mix ozone and water, and radiate the same. It is further desirable that the device be provided with a washing assembly for removing accretions on elements of the device.

SUMMARY OF THE INVENTION

A primary object of the present invention is to provide a single device that can mix ozone and water, and radiate the same on-line. Another object of the present invention is to provide a washing assembly that can remove accretions on protective sheaths enclosing lamps to reduce energy loss.

The present invention in one preferred embodiment relates to a device for on-line radiating gas-containing liquid with light. The device mainly contains a gas-liquid mixer, a gas-liquid separator, multiple lamps, and a washing assembly. The gas-liquid mixer contains a liquid inlet through which a liquid is introduced in, a gas inlet through which a gas is sucked in and mixes with the liquid such that at least part of the gas is dissolved in the liquid to produce a gas-liquid mixture, and a gas-liquid outlet through which the gas-liquid mixture flows out. The detailed structure of the gas-liquid mixer is based on U.S. Pat. No. 6,534,023. The gas-liquid separator contains a conduit provided inside the gas-liquid separator with a lower end thereof connected to the gas-liquid outlet of the gas-liquid mixer and an upper end thereof extending to near a top of the gas-liquid separator wherein a top of the upper end is sealed and multiple pores are disposed near the top of the upper end, an outlet disposed near the bottom of the gas-liquid separator, and a gas-release valve disposed near a top of the gas-liquid separator. A similar gas-liquid separator adaptable to the present invention has been disclosed in U.S. Pat. Appl. Pub. US 2006/0037899 and labeled with reference numeral 30. The multiple lamps are disposed coaxially inside protective sheaths transparent to light respectively. The protective sheaths are disposed inside the gas-liquid separator, placed around and generally parallel to the conduit, and fixed on the bottom of the gas-liquid separator. The washing assembly is for removing accretions on the protective sheaths and contains at least one holder, and means for driving the at least one holder to move axially along the protective sheaths. The holder has plural through holes and a center hole allowing the conduit of the gas-liquid separator to pass through. Each of the plural through holes has a scraper mechanism therein for scraping the accretions on each of the protective sheaths. Each of the protective sheaths passes through the scraper mechanism. In operation, the gas-liquid mixture together with an un-dissolved gas are drawn into the conduit of the gas-liquid separator from the gas-liquid outlet of the gas-liquid mixer and the gas-liquid mixture is sprayed against an inner wall of the gas-liquid separator through the multiple pores of the upper end of the conduit where the un-dissolved gas is separated from the gas-liquid mixture and remains near the top of the gas-liquid separator and creates a partial pressure of gas, which is adjustable by the gas-release valve of the gas-liquid separator while the gas-liquid mixture flows downwardly and is radiated by the multiple lamps and then flows out from the outlet of the gas-liquid separator.

The present invention in another preferred embodiment relates to a scraper mechanism incorporated with a device for on-line radiating gas-containing liquid with light as the aforementioned embodiment and primarily containing a generally hollow-cylinder-shaped housing, a ring-shaped stopper, and at least one ring-shaped scraper. The housing forms an inner flange in a bottom thereof. The stopper is fixed in the housing and flush with a top of the housing. The stopper and the inner flange of the housing define a chamber. The scraper has a tapered inner edge, is disposed and movable in the chamber, and has an inner diameter smaller than those of the stopper and the inner flange.

BRIEF DESCRIPTION OF THE DRAWINGS

The above objects and advantages of the present invention will become more apparent from the following description of a preferred embodiment thereof with reference to the attached drawings, in which.

DETAILED DESCRIPTION OF THE PREFERRED EMBODIMENTS

Figure 1A:
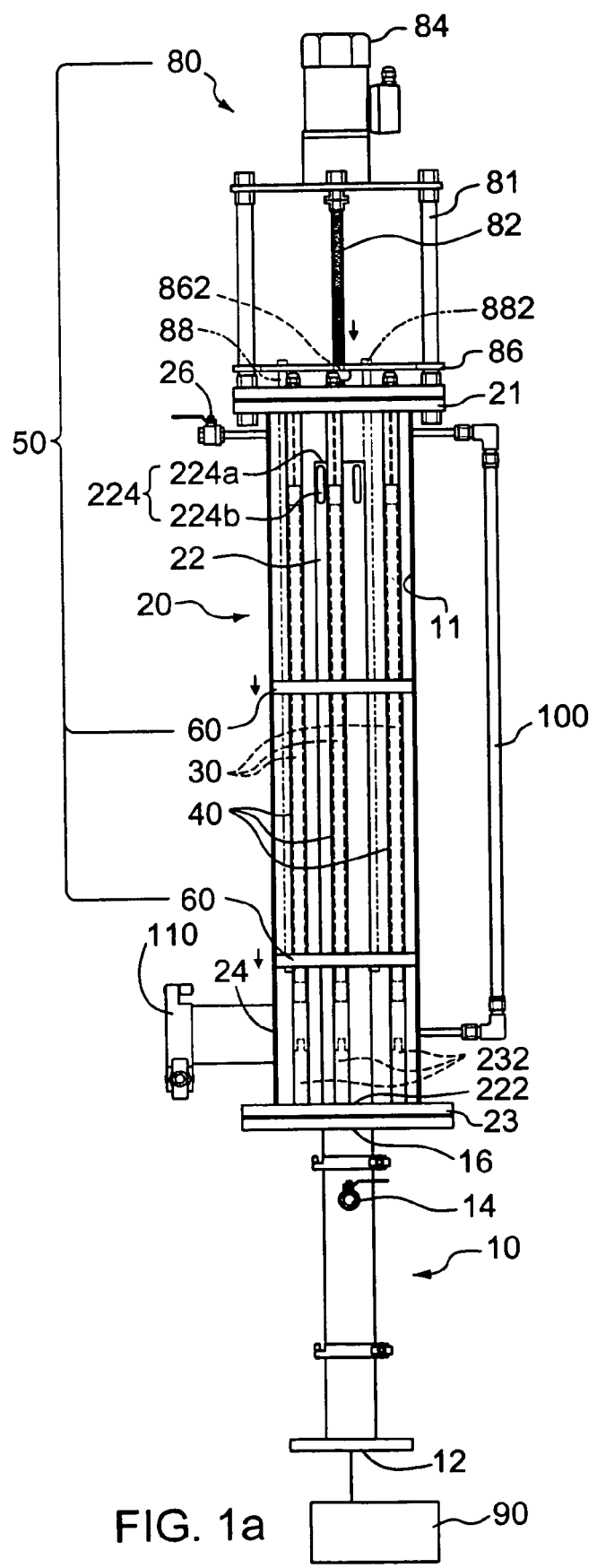
FIG. 1a is an elevational view of a preferred embodiment according to the present invention wherein holders of the washing assembly are driven downwardly.

With reference to FIGS. 1a, 1b, 1c, 2a, 2b, and 3, the preferred embodiment of the present invention is a device for on-line radiating gas-containing liquid with light wherein the gas is ozone, the liquid is water and the light is UV light. The device mainly contains, a gas-liquid mixer 10, a gas-liquid separator 20, multiple UV lamps 30, a washing assembly 50, and a driving pump 90.

The gas-liquid mixer 10 is generally in the form of a tube, which contains a liquid inlet 12 at an end thereof through which water is introduced in, a gas inlet 14 at a side thereof through which ozone is sucked in and mixes with the water such that at least part of the ozone is dissolved in the water to produce an ozone-water mixture, and a gas-liquid outlet 16 at another end thereof through which the ozone-water mixture flows out. The driving pump 90 is a commercial pump connected to the liquid inlet 12 of the gas-liquid mixer 10 whereby water is pumped into the gas-liquid mixer 10. The gas-liquid separator 20 is generally in the form of a hollow cylinder, which contains a conduit 22 provided inside the gas-liquid separator 20 with a lower end 222 thereof connected to the gas-liquid outlet 16 of the gas-liquid mixer 10 and an upper end 224 thereof extending to near a top 21 of the gas-liquid separator 20 wherein a top 224a of the upper end 224 is sealed and multiple pores 224b are disposed near the top 224a of the upper end 224. An outlet 24 is disposed near a bottom 23 of the gas-liquid separator 20, and a gas-release valve 26 is disposed near the top 21 of the gas-liquid separator 20. A liquid level monitor 100 is attached to and connected with the gas-liquid separator 20 for monitoring the level of the ozone-water mixture therein and an outlet pipe 110 is connected with the outlet 24 of the gas-liquid separator 20. The shell of the gas-liquid separator 20 is made of stainless steel. The bottom 23 of the gas-liquid separator 20 contains multiple pins 232 thereon.

Figures 2A, 2B:
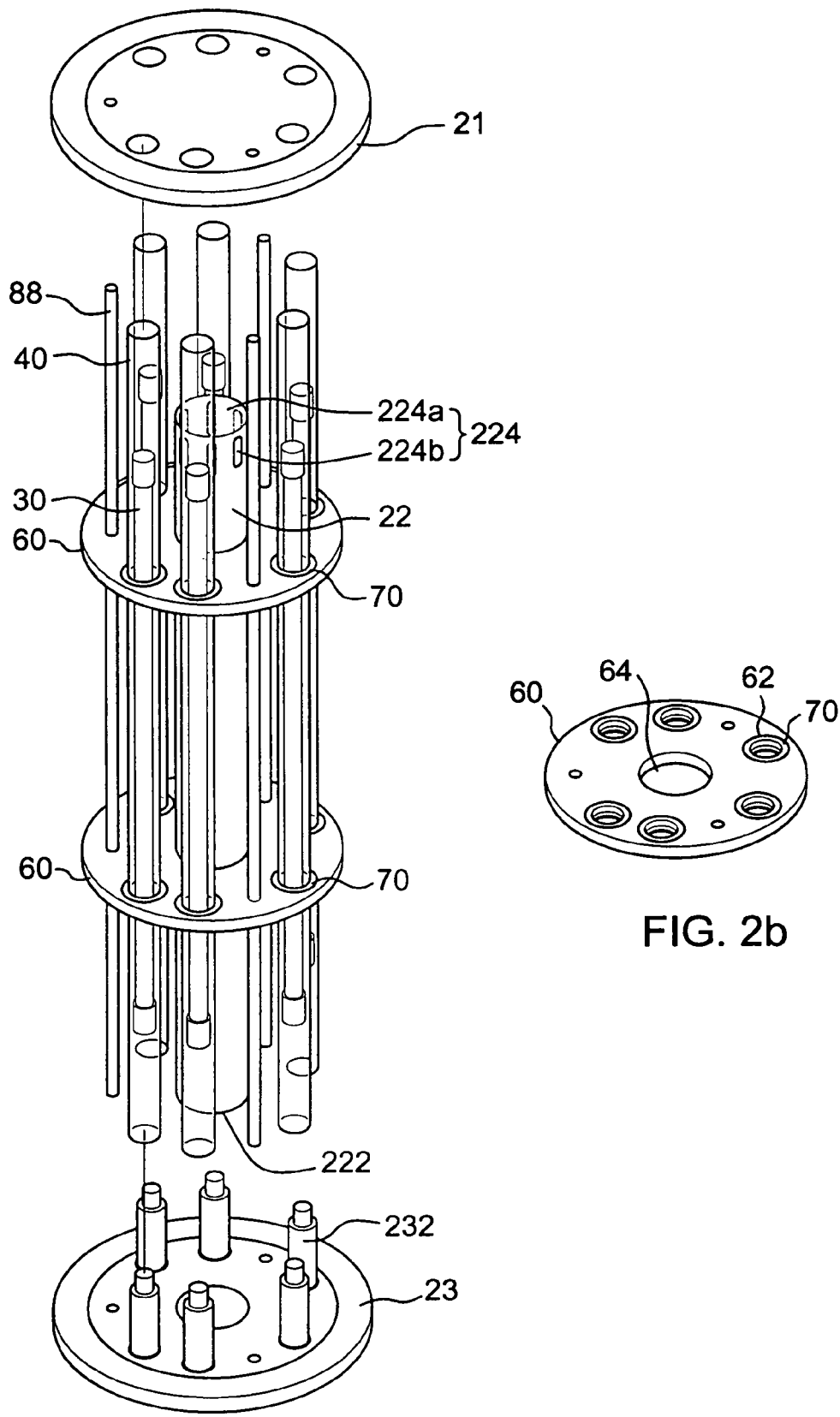
FIG. 2a is a schematic perspective view showing that the multiple lamps are disposed coaxially inside the protective sheaths and generally parallel to the conduit.
FIG. 2b is a schematic perspective view of a holder of the washing assembly.
Figure 3:
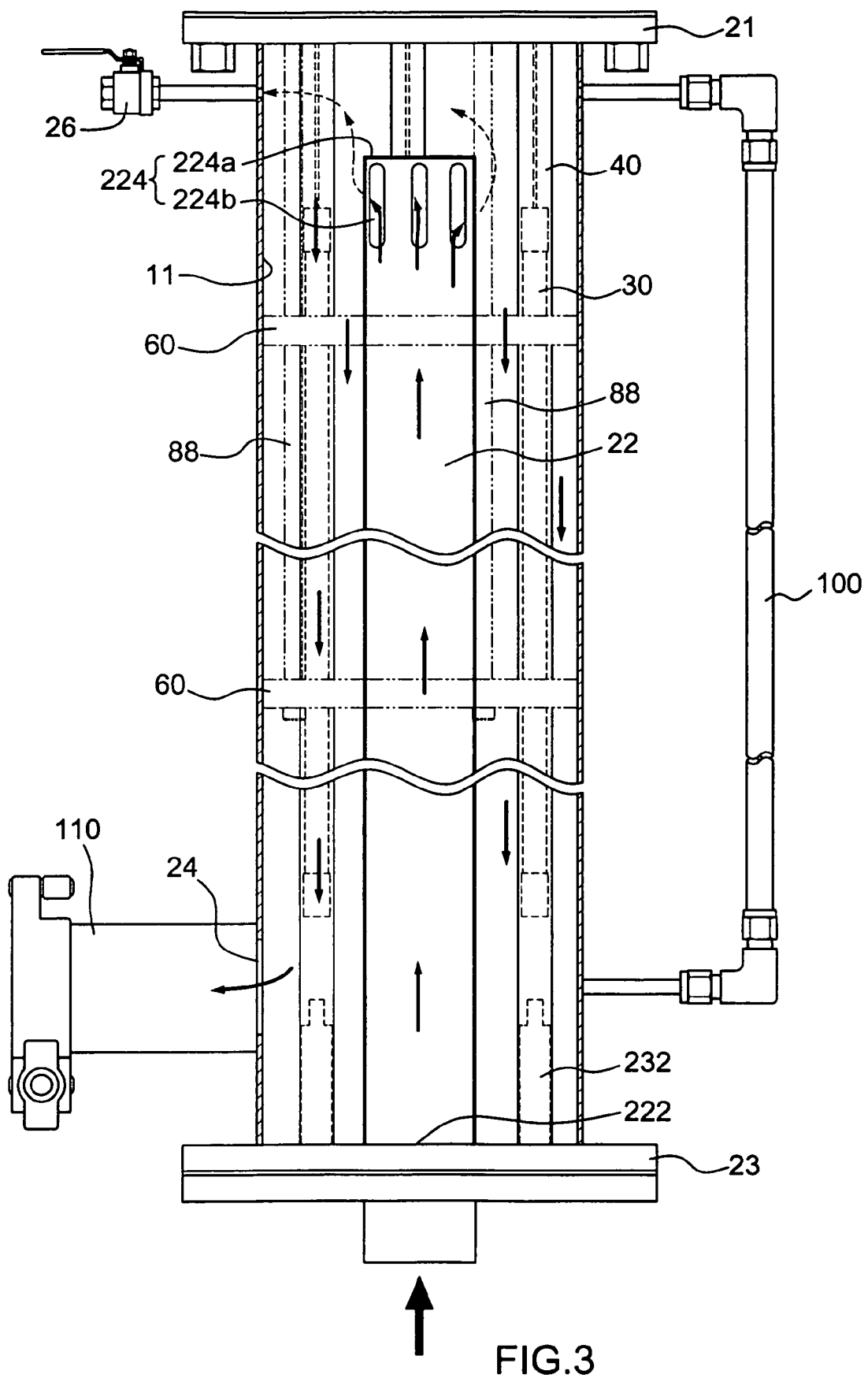
FIG. 3 is a schematic view of the gas-liquid separator.

Referring to FIG. 2a, a plurality of protective sheaths 40 are disposed inside the gas-liquid separator 20, and placed around and generally parallel to the conduit 22. The multiple UV lamps 30 are disposed coaxially inside protective sheaths 40 which are transparent to UV light respectively. The protective sheaths 40 are preferably made in the form of quartz tubes, which are resistant to high temperature. The protective sheaths 40 are engaged to and fixed with the multiple pins 232 on the bottom 23 of the gas-liquid separator 20 with one end and connected to the top 21 of the gas-liquid separator 20 with the other end. In operation, as shown in FIG. 3, the gas-liquid mixture (indicated by solid arrow lines) together with an un-dissolved gas are drawn into the conduit 22 of the gas-liquid separator 20 from the gas-liquid outlet 16 of the gas-liquid mixer 10 and the gas-liquid mixture is sprayed against an inner wall 11 of the gas-liquid separator 20 through the multiple pores 224b of the upper end 224 where the un-dissolved ozone (indicated by dashed arrow lines) is separated from the ozone-water mixture and remains near the top 21 of the gas-liquid separator 20 and creates a partial pressure of gas, which is adjustable by the gas-release valve 26 of the gas-liquid separator 20 while the ozone-water mixture flows downwardly and is radiated by the multiple UV lamps 30 and then flows out from the outlet 24 of the gas-liquid separator 20 into the outlet pipe 110. In addition to facilitating dissolving the ozone in the water, the partial pressure at the outlet 24 of the gas-liquid separator 20 also facilitates the ozone-water mixture to flow out of the outlet 24. However, during the operation process, the accretions existed in the ozone-water mixture attach to the protective sheaths 40 of the gas-liquid separator 20 and cause energy loss.

The washing assembly 50 is for removing accretions on the protective sheaths 40 of the gas-liquid separator 20 and contains two holders 60, and means 80 for driving the two holders 60 to move axially along the protective sheaths 40 of the gas-liquid separator 20. Each of the two holders 60 has plural through holes 62 and a center hole 64 allowing the conduit 22 of gas-liquid separator 20 to pass through. Each of the plural through holes 62 has a scraper mechanism 70 (see FIG. 2b) therein for scraping the accretions on each of the protective sheaths 40. Each of the protective sheaths 40 passes through the scraper mechanism 70.

Figure 1B:
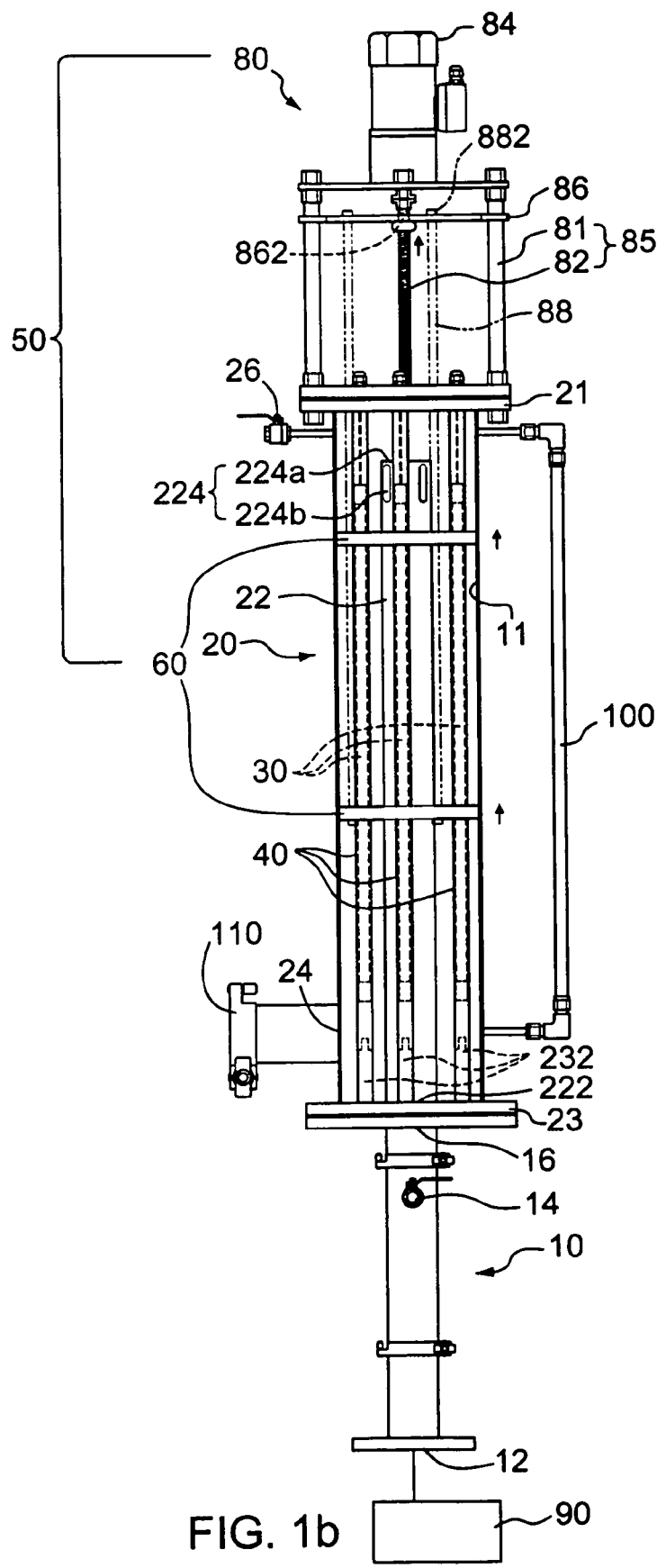
FIG. 1b is an elevational view of the preferred embodiment according to the present invention wherein holders of the washing assembly are driven upwardly.
Figure 1C:
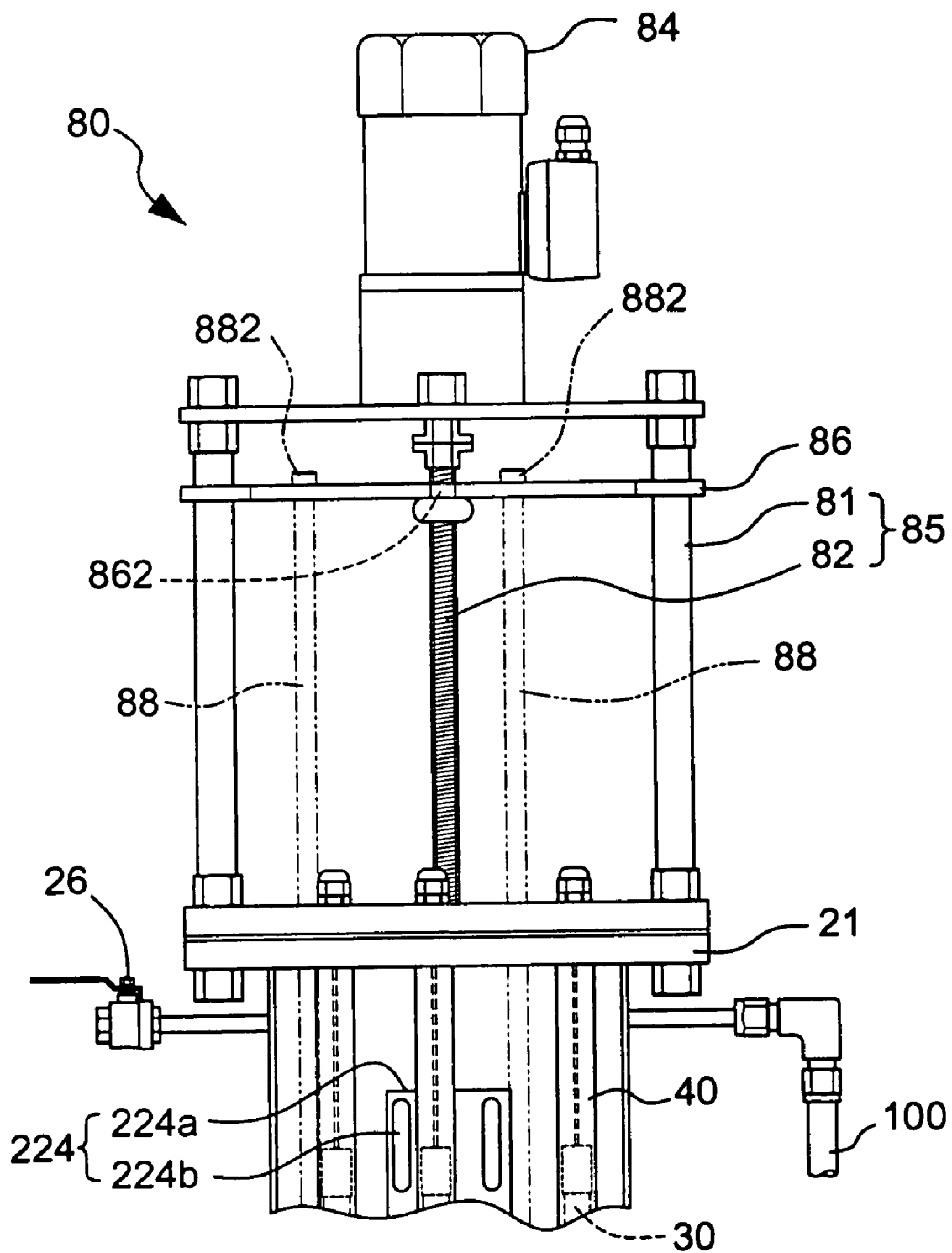
FIG. 1c is an enlarged view of the means for driving the holders to move axially along the protective sheaths.

Referring to FIG. 1c, the means 80 for driving the two holders 60 primarily contains a frame 85, a driving motor 84, a plate 86, and three rods 88. The frame 85 is fixed on the top 21 of the gas-liquid separator 20 by bolts and has plural posts 81 at the surroundings thereof and a worm shaft 82 rotatably disposed generally in the center thereof. The driving motor 84 is disposed on the frame 85 for driving the worm shaft 82 to rotate. The plate 86 is disposed among the plural posts 81 and has a center hole 862 engagable with threads of the worm shaft 82. The plate 86 is slidably secured to the plural posts 81 to prevent the plate 86 from rotating. The three rods 88 are fixed to the plate 86 with upper ends 882 respectively, slidably pass through the top 21 of the gas-liquid separator 20 and are fixed to the two holders 60 (see FIG. 2a). In operation, as shown in FIG. 1a, when the driving motor 84 drives the worm shaft 82 to rotate in one direction (e.g. clockwise), the plate 86 moves downwardly along the worm shaft 82. Since the three rods 88 are fixed to the plate 86 and the two holders 60 are fixed to the three rods 88, the two holders 60 moves synchronously with the plate 86. As shown in FIG. 1b, when the driving motor 84 drives the worm shaft 82 to rotate in another direction (e.g. counter-clockwise), the plate 86 together with the two holders 60 moves upwardly. Thereby, as shown in FIG. 2a, the scraper mechanisms 70 in the two holders 60 moving downwardly and upwardly along the protective sheaths 40, remove accretions such as mineral deposits on the protective sheaths 40.

Figure 4A:
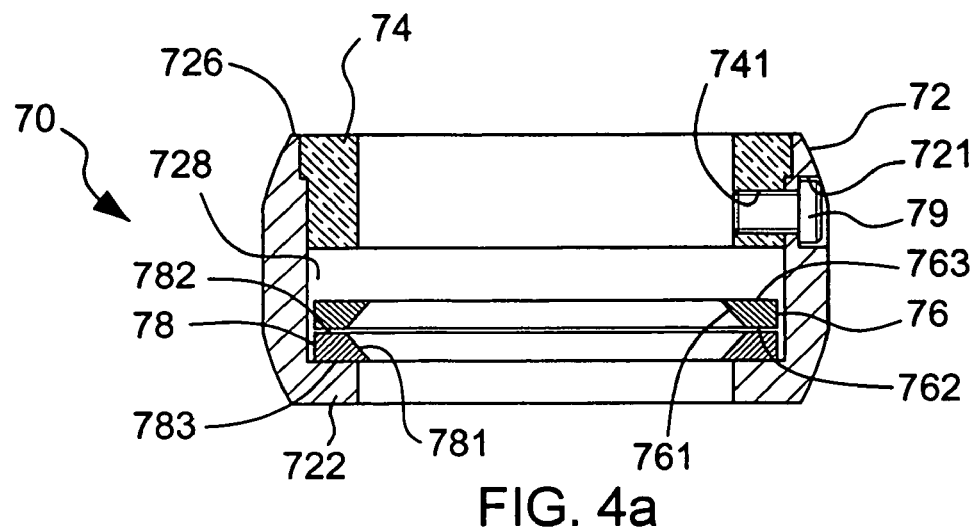
FIG. 4a is a cross sectional view of the scraper mechanism.
Figure 4B:
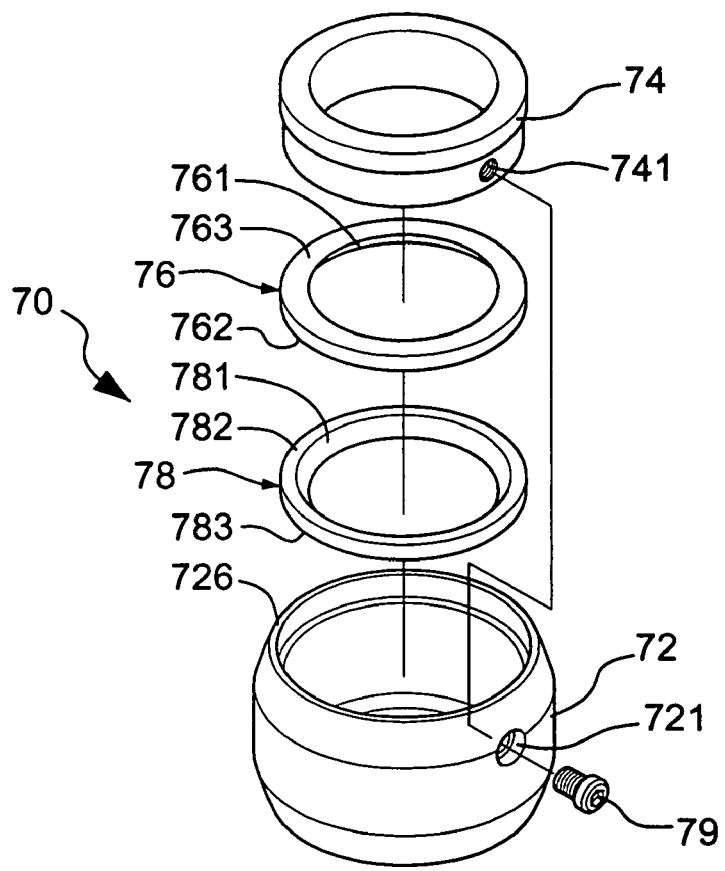
FIG. 4b is an explosive view of the scraper mechanism.

Referring to FIGS. 4a and 4b, the scraper mechanism 70 mainly contains a generally hollow-cylinder-shaped housing 72, a ring-shaped stopper 74 made of metal, a first ring-shaped scraper 76, and a second ring-shaped scraper 78. The housing 72 forms an inner flange 722 in a bottom thereof. The stopper 74 is fixed in the housing 72 and flush with a top 726 of the housing 72. The stopper 74 forms a threaded hole 741 at an edge thereof corresponding to a through hole 721 in the housing 72 whereby a screw 79 passes through the through hole 721 and is threadly connected with the threaded hole 741. The stopper 74 and the inner flange 722 of the housing 72 define a chamber 728. The second ring-shaped scraper 78 is disposed under the first ring-shaped scraper 76. An inner edge 761 of the first ring-shaped scraper 76 is tapered from a lower edge 762 to an upper edge 763 thereof and an inner edge 781 of the second ring-shaped scraper 78 is tapered from an upper edge 782 to a lower edge 783 thereof. The inner diameters of the scrapers 76, 78 and the outer diameter of each of the protective sheaths 40 are smaller than the inner diameters of the stopper 74 and the inner flange 722 of the housing 72. The scrapers 76, 78 and the housing 72 are preferably made of Teflon. The first ring-shaped scraper 76 and the second ring-shaped scraper 78 are movable relative to each other in the chamber 728. The design of dual scrapers 76, 78 can more efficiently remove accretions on the protective sheaths 40.

Figure 5A:
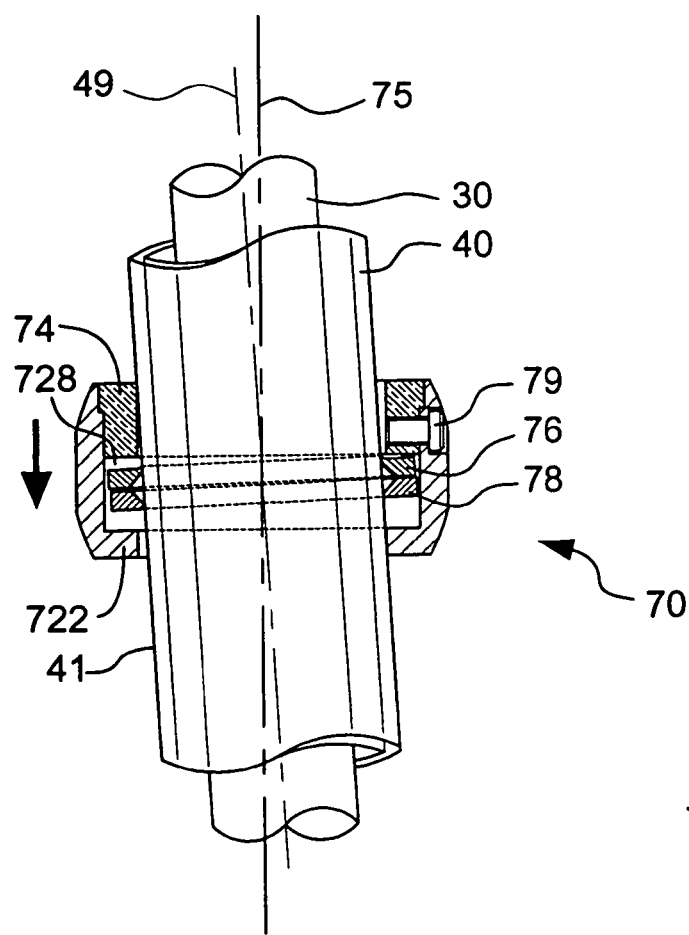
FIG. 5a is a cross sectional view showing that the scrapers of the scraper mechanism fit with the protective sheath, which is tilted to the left.
Figure 5B:
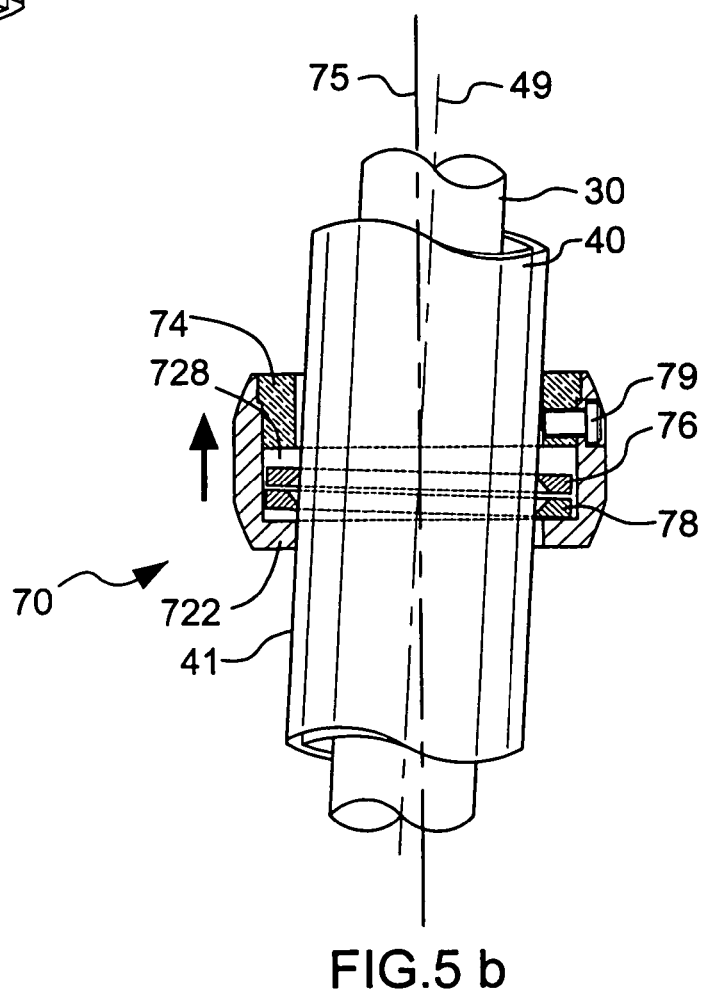
FIG. 5b is a cross sectional view showing the scrapers of the scraper mechanism fit with the protective sheath, which is tilted to the right.

Referring to FIGS. 5a and 5b, the design of the scraper mechanism 70 can safeguard the protective sheaths 40 from damage due to slight tilt of the protective sheaths 40 (the axis 49 of the protective sheaths 40 is not overlapped with the axis 75 of the scraper mechanism 70). When each of the protective sheaths 40 passes through the scraper mechanism 70, the tapered inner edges 761, 781 of the scrapers 76, 78 fit an outer edge 41 of the protective sheaths 40. Because the outer diameters of each of the protective sheaths 40 are smaller than the inner diameters of the stopper 74 and the inner flange 722 of the housing 72, gaps exist between the protective sheaths 40 and the inner flange 722 of the housing 72 as well as the protective sheaths 40 and the stopper 74 whereby the housing 70 united with the fixed stopper 74 is movable relative to the outer edge 41 of said protective sheath 40 while the scrapers 76, 78 are still in tight contact with the outer edge 41 of said protective sheath 40. In addition, the scrapers 76, 78 will adjust their locations in the chamber 728 depending on tilt orientation of the protective sheaths 40. Thereby the scraper mechanism 70 will not over stress on the outer edge 41 of the protective sheaths 40 and cause the protective sheaths 40 to break apart due to slight tilt of the protective sheaths 40.

Accordingly, the device of the preferred embodiment in accordance with the present invention efficiently dissolves ozone into water and radiates the ozone-water mixture with UV light to disinfect water. Furthermore, the radiated water produces hydroxide ions, which are also useful in disinfecting water.

The invention may also be implemented in other specific modes without departing from the spirit and the essence of the invention. Thus, the above-mentioned preferred embodiments shall be regarded as explanatory but not restrictive. All changes consistent with the meaning and range of the claims and the equivalents shall fall within the scope claimed by the invention.

I claim:

1. A device for on-line light radiation in gas-containing liquid comprising:
   a gas-liquid mixer comprising:
   a liquid inlet through which a liquid is introduced in;
   a gas inlet through which a gas is sucked in and mixes with said liquid such that at least part of said gas is dissolved in said liquid to produce a gas-liquid mixture; and
   a gas-liquid outlet through which said gas-liquid mixture flows out;
   a gas-liquid separator comprising;
   a conduit provided inside said gas-liquid separator with a lower end thereof connected to said gas-liquid outlet of said gas-liquid mixer and an upper end thereof extending to near a top of said gas-liquid separator, a top of said upper end being sealed and multiple pores being formed near said top of said upper end;
   an outlet disposed near a bottom of said gas-liquid separator; and
   a gas-release valve disposed near said top of said gas-liquid separator;
   multiple lamps disposed coaxially inside protective sheaths transparent to light respectively, said protective sheaths being disposed inside said gas-liquid separator, placed around and generally parallel to said conduit, and fixed on said bottom of said gas-liquid separator; and
   a washing assembly for removing accretions on said protective sheaths, said washing assembly comprising:
   at least one holder having plural through holes and a center hole allowing said conduit of gas-liquid separator to pass through, each of said plural through holes having a scraper mechanism therein for scraping said accretions on each of said protective sheaths, through said scraper mechanism, each of said protective sheaths passing through; and
   means for driving said at least one holder to move axially along said protective sheaths;
   wherein said gas-liquid mixture together with an un-dissolved gas are drawn into said conduit of said gas-liquid separator from said gas-liquid outlet of said gas-liquid mixer and said gas-liquid mixture is sprayed against an inner wall of said gas-liquid separator through said multiple pores of said upper end of said conduit where said un-dissolved gas is separated from said gas-liquid mixture and remains near said top of said gas-liquid separator and creates a partial pressure of gas, which is adjustable by said gas-release valve of said gas-liquid separator while said gas-liquid mixture flows downwardly and is radiated by said multiple lamps and then flows out from said outlet of said gas-liquid separator.

2. The device of claim 1, wherein said protective sheaths transparent to light are quartz tubes, said light is UV light, and said multiple lamps of said gas-liquid separator are multiple UV lamps.

3. The device of claim 1, wherein said means for driving said at least one holder comprises:
   a frame fixed on top of said gas-liquid separator and comprising plural posts and a worm shaft rotatably disposed generally in the center thereof;
   a driving motor disposed on said frame for driving said worm shaft to rotate;
   a plate disposed among said plural posts and having a center hole engagable with threads of said worm shaft, said plate being slidably secured to said plural posts for preventing said plate from rotation;
   plural rods fixed to said plate with upper ends respectively, slidably pass through said top of said gas-liquid separator and fixed to said at least one holder;
   whereby when said driving motor drives said worm shaft to rotate, said plate moves axially along said worm shaft and said at least one holder is driven by said plural rods.

4. The device of claim 2, wherein said scraper mechanism of said at least one holder comprises:
   a generally hollow-cylinder-shaped housing forming an inner flange in a bottom thereof;
   a ring-shaped stopper fixed in said housing and flush with a top of said housing, said stopper and said inner flange of said housing defining a chamber; and
   at least one ring-shaped scraper having a tapered inner edge, being disposed and movable in said chamber, and having an inner diameter smaller than those of said stopper and said inner flange;
   wherein when each of said protective sheaths passes through said scraper mechanism, said tapered inner edge of said scraper fits an outer edge of said protective sheaths.

5. The device of claim 2, wherein said gas is ozone and said liquid is water.

6. The device of claim 5, further comprising a driving pump connected to said liquid inlet of said gas-liquid mixer whereby said water is pumped into said gas-liquid mixer.

7. The device of claim 6 further comprising a liquid level monitor attached to and communicated with said gas-liquid separator for monitoring a level of said gas-liquid mixture therein.

8. The device of claim 7, further comprising an outlet pipe connected with said outlet of said gas-liquid separator.

9. The device of claim 8, wherein said bottom of said gas-liquid separator comprises multiple pins thereon which are engaged to and fixed on said protective sheaths.

10. The device of claim 4 wherein said at least one ring-shaped scraper comprises a first ring-shaped scraper and a second ring-shaped scraper disposed under said first ring-shaped scraper, an inner edge of said first ring-shaped scraper being tapered from a lower edge to an upper edge thereof and an inner edge of said second ring-shaped scraper being tapered from an upper edge to a lower edge thereof, said first ring-shaped scraper and said second ring-shaped scraper being movable relative to each other in said chamber.

11. The device of claim 10 wherein said stopper is fixed in said housing by at least one screw.

12. The device of claim 11 wherein said first ring-shaped scraper, said second ring-shaped scraper, and said housing are made of Teflon.

* * * * *